T. J. BURKE.
ANIMAL TRAP.
APPLICATION FILED JUNE 15, 1912.
1,059,114.
Patented Apr. 15, 1913.
4 SHEETS—SHEET 1.
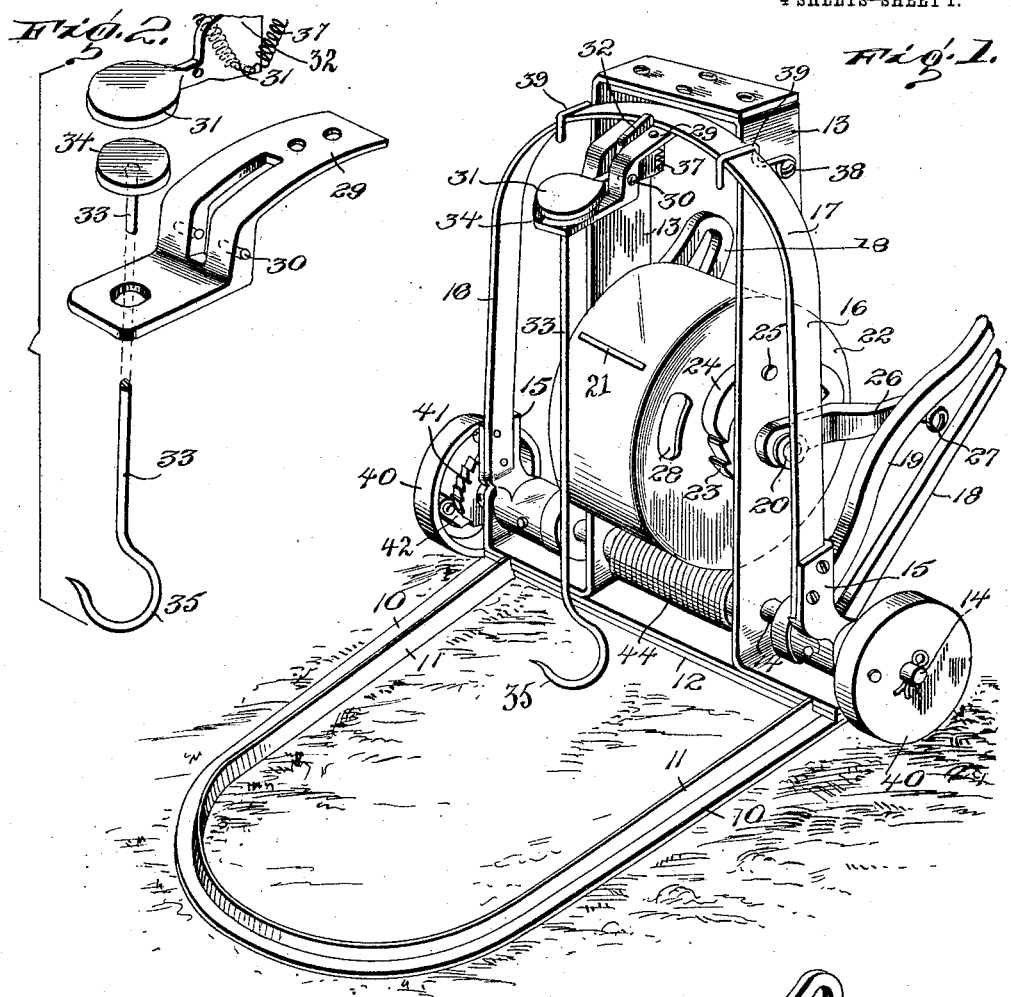
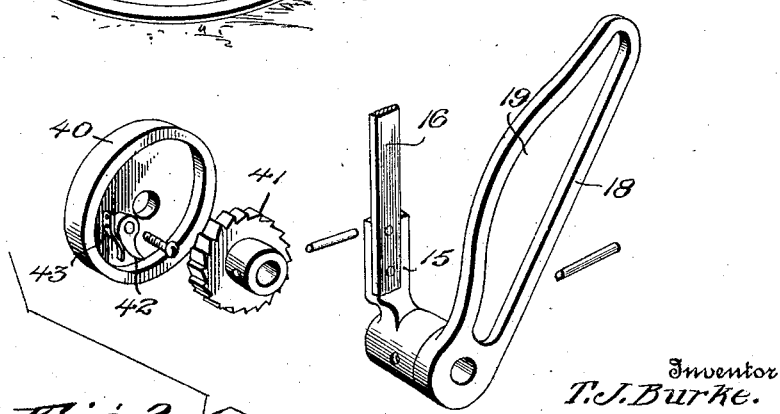
Inventor
T. J. Burke.
Witnesses T. J. BURKE.
ANIMAL TRAP.
APPLICATION FILED JUNE 15, 1912.
1,059,114.
Patented Apr. 15, 1913.
4 SHEETS—SHEET 2.
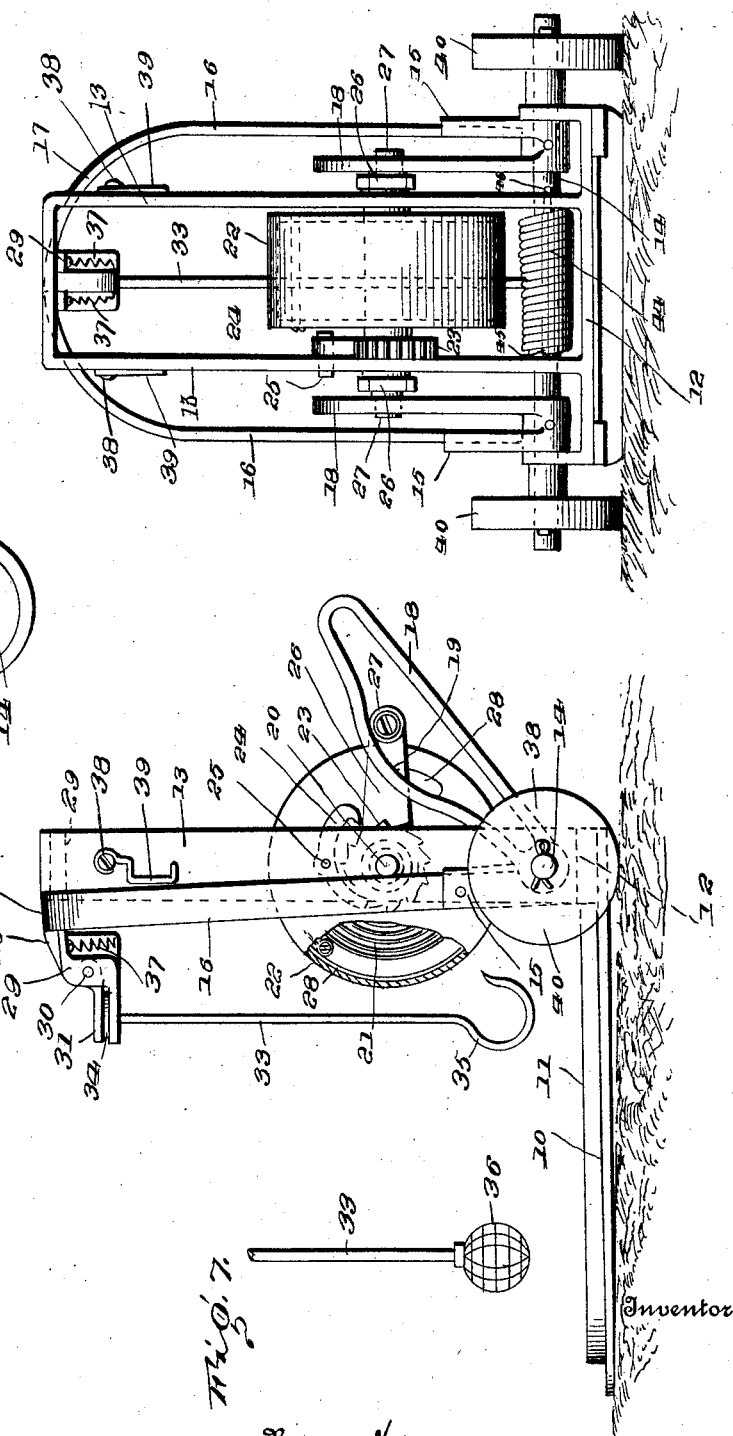

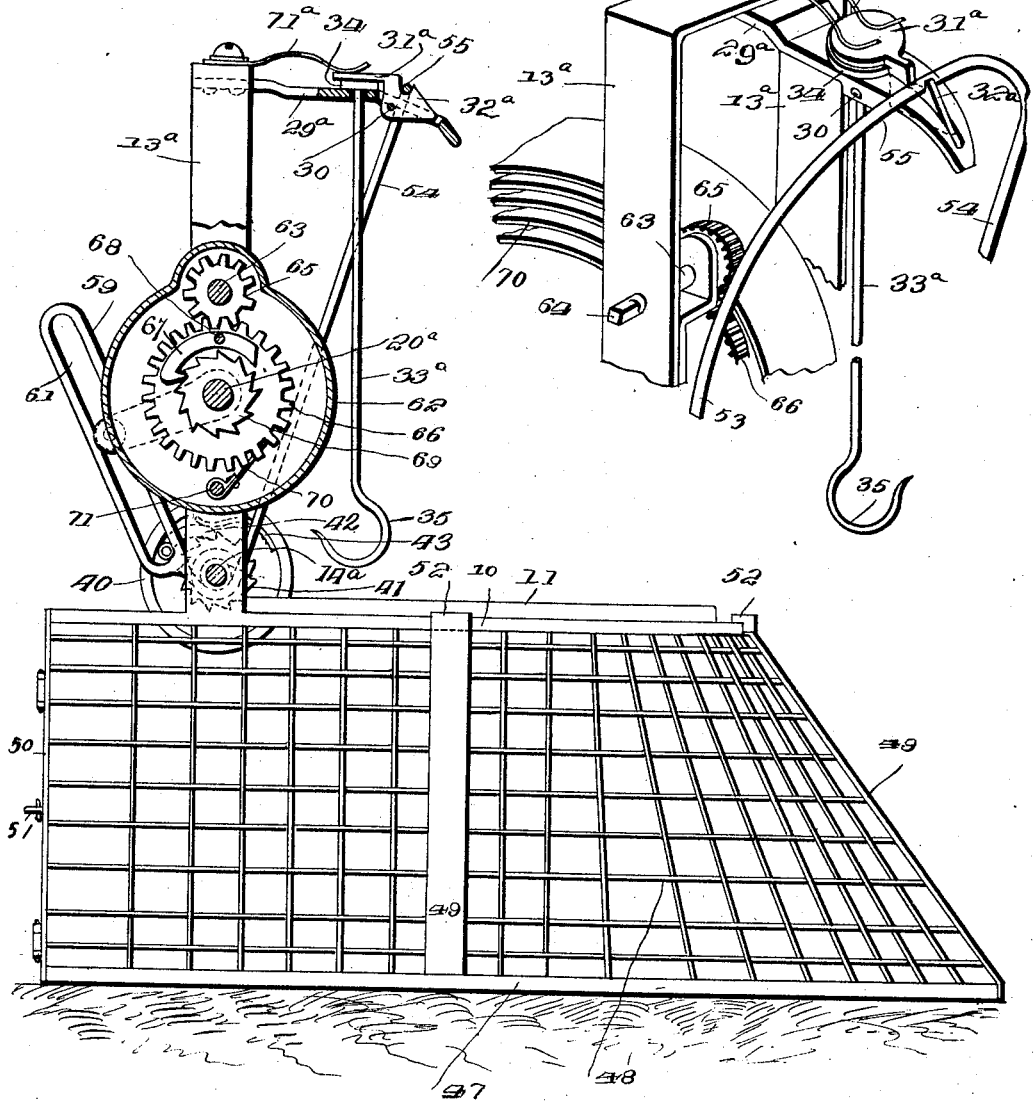

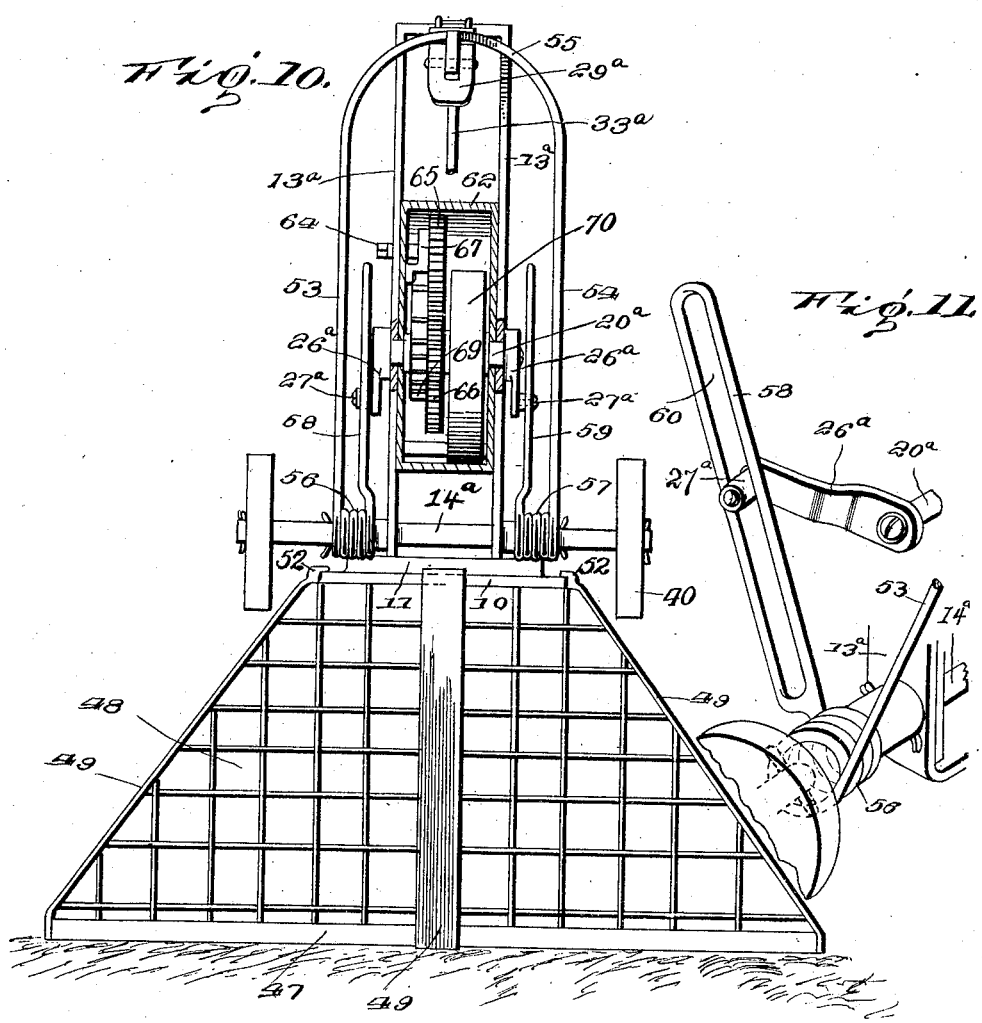

UNITED STATES PATENT OFFICE.

THOMAS J. BURKE, OF NEW ORLEANS, LOUISIANA.

ANIMAL-TRAP.

1,059,114.  Specification of Letters Patent. Patented Apr. 15, 1913.

Application filed June 15, 1912. Serial No. 703,970.

*To all whom it may concern:*

Be it known that I, THOMAS J. BURKE, citizen of the United States, residing at New Orleans, in the parish of Orleans and State of Louisiana, have invented certain new and useful Improvements in Animal-Traps, of which the following is a specification.

This invention relates to animal traps of the class wherein provision is made for automatically resetting the trap for a predetermined number of times, and has for one of its objects to improve the construction and increase the efficiency and utility of devices of this character.

Another object of the invention is to provide a simply constructed trap device including an operating spring adapted to be wound up and capable of being automatically reset after each tripping operation.

Another object of the invention is to provide a device of this character which will reset itself after each operation and automatically move the trap away from the animal that has been killed, to prevent obstructing the approach of the next animal.

Another object of the invention is to provide a trap including a bait cage for containing live bait and so constructed that the cage assists in removing the killed animals a sufficient distance from the striking portion to prevent obstruction.

Another object of the invention is to provide a trap of improved construction which may be readily adapted without material structural change for trapping different sizes of animals such as mice, rats, mink, opossum, rabbits, foxes, and the like.

With these and other objects in view, the invention consists in certain novel features of construction and novel movements in the same as hereafter shown and described, and then specifically pointed out in the claims, and in the drawings illustrative of the preferred embodiment of the invention: Figure 1 is a perspective view of the improved trap; Fig. 2 represents perspective details of the trigger mechanism; Fig. 3 represents perspective details of the striker mechanism and the mechanism for moving the trap rearwardly after each action; Fig. 4 is a side elevation, partly in section, of the improved trap; Fig. 5 is a rear elevation; Fig. 6 is a view from the inside of one of the carrying wheels, illustrating the construction of the ratchet; Fig. 7 is a detail of a modified form of bait holder; Fig. 8 is a side view, partly in section, of a modified form of the improved trap; Fig. 9 is a perspective detail of the trigger mechanism employed in the modified structure shown in Fig. 8; Fig. 10 is a front elevation of the modified construction shown in Fig. 8; Fig. 11 is a perspective detail of a portion of the striker mechanism employed in the structure shown in Figs. 8 and 10.

Corresponding and like parts are referred to in the following description and indicated in all the views of the drawings by the same reference characters.

The trap portion of the improved device comprises a base member 10 which is preferably formed with spaced parallel sides and one curved end, and is also provided with an upwardly directed rib 11 extending around the inner edges of the sides and the curved end.

Extending transversely of the frame 10 at its rear end is a member 12 upon which a vertical frame 13 is mounted, the latter being utilized to support the striker and its operating mechanism. The striker portion of the improved device includes a transverse rod 14 to which clips 15 are rigidly connected so that they partake of the motion of the rod. The striker proper of the device is formed from a U-shaped member including spaced sides 16 extending in parallel relations and connected by an outer curved portion 17, with the inner ends of the sides 16 connected rigidly to the clips as shown. The striker is preferably formed of a single strip of relatively heavy flat metal such as steel and suitably tempered and of sufficient strength to impart the necessary killing blow to the animal. The striker stands substantially vertical when in its elevated or "set" position and conforms in outline to the base 10 and its rib 11 so that when it is in its lower position it will bear upon the base and around the outer face of the rib.

Formed integral with the clips 15, are slotted arms 18, the slots of the arms being curved outwardly at one side as represented at 19, the object to be hereafter explained. Extending through the side members 13 of the frame is a spring-carrying shaft 20 to which one end of a coil spring 21 is connected while the opposite end is connected to a casing 22 which is mounted for rotation upon the shaft 20. Mounted upon the shaft 20, next to one of the side members of the frame 13, is a ratchet wheel 23 with which a double-ended backing pawl 24 is arranged to be engaged, the pawl being pivoted at 25 intermediate its ends to the adjacent frame member 13. The pawl 24 is adapted to be alternately connected by its ends with the teeth of the ratchet and operates to hold the spring in strained relation, as will be obvious. Connected to the shaft 20, are arms 26 each having an anti-friction roller 27 at its outer end engaging within the slot of the adjacent arm 18.

In the construction shown, the casing 22 is utilized as a winding medium for the spring, and to assist in this operation the casing is provided with thumb-receiving depressions 28 at suitable intervals to enable the requisite grip to be applied thereto, while the pawl 24 operates to retain the spring in its wound condition.

Connected to the upper end of the frame 13, is an arm 29 which is directed downwardly and thence forwardly, and provided with a relatively large aperture in its forwardly directed portion. Pivoted at 30 within a longitudinal slot in the arm 29 is a trigger formed with a relatively flat disk 31 at one end and a trip pawl 32 at the other end. The trip pawl projects above the arm 29 and into the path of the curved upper portion 17 of the striker, so that so long as the trip is in its elevated position, it will hold the striker in its "set" position. Extending through the aperture of the arm 29, is a trip rod 33 having a disk-shaped head 34 extending between the flattened portion 31 of the trip and the forwardly extending portion of the arm 39. At its lower end the rod 33 is provided with a suitable bait-engaging device, such as a hook 35, upon which the bait is impaled, or with a wire cage represented at 36 in which the bait may be inclosed. The rod 33 is considerably smaller than the opening in the member 29 and is rigidly connected to the disk 34, so that any lateral movement imparted to the bait-engaging terminal of the rod will cause the disk 34 to be tilted and elevate the portion 31 of the trigger and thus depress the portion 32 thereof and release the striker. Thus it will be obvious that no matter in what direction the rod 33 may be moved, it will result in releasing the trigger, so that any displacement of the bait in any direction, will cause the release of the striker.

Springs 37 are connected to the trigger and the arm 29 and operate to maintain the trip pawl 32 yieldably in its upper position or in engagement with the striker. The upper edge of the trip pawl is inclined so that when the striker is moved into its upper position it will automatically engage over the trip pawl and be held in its "set" position thereby. Thus when the striker is elevated it will automatically engage the trigger and be retained in position thereby until released by the movement of the trip rod 33. Mounted to swing at 38 upon the frame 13, are hooks 39 adapted to engage over the striker and lock the latter in open position. By this arrangement when the hooks 39 are engaged with the striker, the latter will not be released by any movement applied to the rod 33, as will be obvious. The hooks 39 are safety appliances to enable the trap to be locked in its set position to insure the safety of the operator when winding the spring 21. After the spring has been properly wound and the trap set as required, the hooks 39 are released and hang in a vertical position as shown in Fig. 4.

The improved trap when thus constructed, may be employed for trapping different animals, and may be disposed upon any support or surface as will be obvious.

In the construction illustrated in Figs. 1 to 6, the arm 14 is provided externally of the clips 15 with carrying wheels 40 which are free to rotate upon the arm in one direction, but are held from rotation in the opposite direction by ratchet wheels 41, the wheels 40 being hollow to receive the ratchets and conceal and protect the same. Pivoted to each wheel 40, is a pawl 42, which engages the teeth of the ratchet, and thus locks the wheel against movement in one direction relative to the rod 14. A spring 43 maintains the pawl yieldably in engagement with the teeth of the ratchet. The striker 16 being secured rigidly to the arm 14, when the striker is depressed, the ratchet wheels 41 are turned ahead a number of teeth, and then when the striker is returned to its substantially vertical position and automatically reset, the striker likewise automatically rotates the wheels 40 rearwardly a portion of a revolution and thus moves the whole trap a corresponding distance which movement moves the trap away from the slain animal, so that it will not interfere with the approach of the next animal. By this simple means it will be obvious that when the striker is actuated to slay an animal, and then automatically restored to its former position, the return movement thus imparted to the striker will cause the trap to be moved a corresponding distance, and this automatic movement will take place each time that the trap is reset after each operation. This is an important feature of my device and materially increases its efficiency and utility and obviates the necessity for removing each animal away from the trap after being slain.

With the device thus constructed, the operation is as follows: After the operator has selected a location for the trap, which should preferably be upon a level surface, so that the wheels 40 will operate properly, the striker is elevated to cause it to engage the trigger 32 and the safety hooks 39 applied to the striker to hold it against the resistance of the spring 21. The casing 22 is then rotated a sufficient number of times to wind up the spring 21, the pawl 24 holding the spring in its wound position as before described. The bait is then applied to the rod 33 as above described, and the safety hooks 39 released.

When an animal approaches the trap and attempts to remove the bait, the rod 33 is actuated and causes the disk 34 to elevate the member 31 of the trigger and depress the pawl 32 from the striker whereupon the spring immediately causes the rotation of the arm 26 which through its wheel 27 within the slot of the arm 18, causes the rotation of the rod 14 and the depression of the striker, thus instantly killing the animal. The length of the arm 26 is so proportioned to the slot in the arm 18 that the continued rotation of the arm 26 will cause the arm 18 to be returned to its former position with the result of restoring the striker to its vertical position and in engagement with the pawl 32 of the trigger. By the time that the striker has been moved into engagement with the trip pawl 32 of the trigger, the arm 26 will have resumed its former position relative to the arm 18, as shown in Fig. 1, and will be prevented from further movement by the engagement therewith of the arm 18, which as will be obvious, is held in stationary position by the trip pawl of the trigger. By this simple means each complete revolution of the shaft 20, effects a complete downward and return movement of the striker, and this operation will be repeated as long as any "life" remains in the spring. The spring 21 will be of sufficient length and strength to cause the striker to operate a certain predetermined number of times with each winding of the spring, and by increasing or decreasing the length of the spring the number of times which the striker may be actuated will be correspondingly increased or decreased, as will be obvious.

Surrounding the bar 14 between the side members 13, is a coiled spring 44 which is connected at one end at 45 to the bar and at the other end at 46 to the adjacent member 13, and exerts its force to assist in moving the striker into its downward position, and thus materially increases the force of the blow. This is especially of value in the larger traps where a very strong killing blow is required. The spring 44 retains its tension even after the arms 26 have been reversed in position and have begun the return movement. By this means the striking of a very strong blow is insured even to the smallest animal.

The clips 15 and the striker 16 being rigidly united to the rod 14, it is necessary to provide for the complete revolution of the arms 26 even when a relatively large animal is struck and prevents the striker being moved into close relation to the base, hence the advantage of the enlargement 19 of the slot of the arm 18 which permits the crank arms 26 to complete their full revolution while leaving the striker in contact with the body of the animal until in their return movement the members 26 again "pick up" the members 18. The spring 44 also serves another important purpose in preventing the slotted arms 18 from being elevated too rapidly or with an injurious jerk during the return stroke, and as the tension of the spring 44 increases as the striker is elevated toward the trigger, it thus serves as a governor, cushion or brake, and prevents the striker from imparting too severe a blow to the frame. The improved device also includes a cage of novel construction for containing live bait and likewise for storing the slain animals when the trap is employed for capturing fur-bearing animals or animals to be preserved for food, to prevent their destruction by free live animals.

The cage portion of the improved device comprises a base 47 preferably of sheet metal and having a suitable supporting frame rising therefrom and converging toward the upper part from the sides and front, while the rear is preferably perpendicular as shown in Fig. 8. The sides top and rear are formed of wire netting of suitable strength and represented conventionally at 48. The frame members of the cage are preferably formed of metal strips and indicated as a whole at 49. The cage may be of any required size and of any required form, but will preferably be formed sloping in two portions from the contracted top which supports the base 10 of the trap, so that after the animal has been slain by the downward stroke of the striker and released when the striker returns to its "set" position, the animal will roll down over the inclined sides of the cage and away from the striker mechanism and base so that it will not obstruct the free approach of the next animal.

The vertical rear side of the cage is provided with a movable closure 50 to provide access to the cage, the closure being provided with a suitable catch 51 to hold it closed.

At their upper ends the members 49 are continued in the form of clips 52 which engage over the outer edges of the base 10 and hold the same in position. By this arrangement it will be obvious that the base 10 may be located upon the cage from the rear, and beneath the clips 52 and thus coupled to the cage. When the base 10 is thus coupled to the cage the wheels 40 become inoperative and may be dispensed with, but when employed they are spaced a sufficient distance apart so that the trap may be connected to the cage without disturbing the wheels.

Another modified construction is illustrated in Figs. 8, 9, 10 and 11, which may be employed when a cheaper construction of trap is required, or when adapted to be employed for killing smaller animals. In the above-noted modified structure, the clips 15 and the form of striker represented at 16—17, is dispensed with and a modified form of striker employed which is formed from a single piece of wire bent into U-shape and conforming in outline to the striker 16—17 and adapted to coöperate with the base 10 and its rib 11 in the same manner. The modified form of striker comprises side members 53—54 connected by a curved outer portion 55 at one end and formed into coils 56—57 at the other end designed to bear around the member 14ª. At their opposite ends the coils are extended into arms 58—59 corresponding to the arms 18 of the structure shown in Figs. 1 and 3. The members 58—59 are bent upon themselves and extended in parallel relation to the body of the arms to form longitudinal slots 60—61, in which the rollers 27ª of the crank arms 26ª operate in the same manner and produce the same results as in the structure shown in Fig. 1. In the modified structure the shaft 20ª is incased in a stationary casing 62 which is rigidly connected to the frame 13ª, as shown. In the modified structure a counter-shaft 63 is mounted for rotation in the casing 62 and extended at one end through one of the side members 13ª and formed with a key-receiving square end 64. The shaft 63 is provided with a pinion 65 which engages with a gear 66 on the shaft 20ª. A double-ended ratchet 67 which corresponds to the ratchet 24, is pivoted at 68 upon the side wall of the casing 62 and engages a ratchet wheel 69 fast to the shaft 20ª. A coil spring 70 is connected at 71 to the casing 62 and at the other end to the shaft 20ª and thus operates in the same manner as the spring 21 in the structure shown in Figs. 1 to 6.

In the modified structure the arm 29ª is slightly changed in shape to cause it to be adapted to the modified form of striker, its free end being curved downwardly approximately concentric with the path of movement of the striker. In this form of the trap, the opening to receive the trip rod 33ª is arranged in rear of the longitudinal slot in the arm 29ª and the trigger is reversed, the head 31ª being at the higher end of the trigger, while the lower end of the trigger has its upper edge inclined and notched to form a pawl 32ª which may be engaged by the striker, as shown in Figs. 8 and 9. Springs 71ª are secured upon the top of the frame 13ª as shown, the operation of this form of the trigger being substantially the same as the form first described. The coils 56—57 between the arms 58 and 59 and the striker mechanism 53—54—55 serve an important function in steadying the action of the sides and likewise form springs in themselves which greatly assist in the action of the striker and increase the force of the blow, in this respect performing to a certain extent the same function as the spring 44 in the structure shown in Fig. 1. The coils 56—57 also permit the arms 26ª to complete their revolution after the striker engages the animal in the same manner as heretofore described regarding the action of the enlargements 19 in the arms 18 shown in Fig. 1.

Having thus described the invention, what is claimed as new is:

1. In an animal trap, a spring-actuated striker, a trigger for holding said striker in poised position, a bait-holding trip device loosely suspended below the trigger and having its upper end bearing upwardly against the trigger and freely movable to release the same, and means whereby the striker is automatically returned to its operative position after each stroke.

2. In an animal trap, a cage for live animals or bait and having outwardly sloping sides, a base adapted to engage the top of the cage, a striker mounted upon said base, a spring arranged to operate said striker, and means whereby the striker is returned to its operative position after each stroke.

3. In an animal trap, a base frame having an upwardly directed rib, a striker conforming in outline to said frame and adapted to engage around said rib, a spring arranged to operate said striker, a spring-controlled trigger for holding the striker in set position, a freely-suspended trip bearing against said trigger to release the same, and means whereby the striker is returned to its operative position after each stroke.

4. In an animal trap a base, carrying wheels at one end of said base, a striker movable upon said base, a spring arranged to operate said striker, means whereby the striker is returned to its operative position after each stroke, and means whereby the carrying wheels are actuated by the return movement of the striker to move the trap a predetermined distance after each action of the striker.

5. An animal trap comprising a striker, arms movable with said striker and each having a longitudinal slot swelling outwardly at one side, a spring-operated shaft, operating arms carried by said spring-operated shaft and engaging the slots of said slotted arms, a trigger to hold said striker in poised position, a trip device carrying a bait holder and arranged to release said trigger to permit the striker to be depressed and automatically reëngaged with the trigger, and another spring associated with said striker and supplementing the striker-actuating spring and serving as a governor to the striker at the return movement.

6. In an animal trap, a supporting base, a rigid frame rising from said base, a rod mounted for rotation in said frame, a striker connected to said rod, a trigger device carried by said frame and engaging said striker, a loosely suspended bait-holding trip member associated with said trigger device, slotted arms extending laterally from and movable with said striker, and spring-actuated arms mounted on said frame above the rotatable rod and engaging the slots of said slotted arms.

7. In an animal trap, a supporting base, a frame rising from said base, a rod mounted for rotation in said frame, a striker connected to said rod, a trigger device carried by said frame and engaging said striker, a bait-holding trip member associated with said trigger device, spring-actuated arms mounted on said frame and connected with the striker to actuate the same, and a supplementary spring connected to said striker and serving as a governor to the same.

8. In an animal trap, a rod mounted for rotation, a striker movable with said rod, means for actuating the striker, a trigger device engaged by said striker, a trip device adapted to release said trigger, and a supplementary spring connected to said striker and operating as a governor to the same.

9. In an animal trap a supporting frame, a rod mounted for rotation in said frame, a striker movable with said rod, a spring arranged to operate said striker, a trigger device engaged by said striker to hold the same in poised position, a trip device adapted to release said trigger, and a supplementary spring connected to said rod and frame and operating as a governor to the striker.

10. In an animal trap, a supporting frame, a rod mounted for rotation in said frame, a striker rising from and movable with said rod, an operating spring mounted in the frame, means whereby said spring is caused to actuate the striker and return the same to initial position, a trigger device at the upper end of the frame engaged by said striker, a loosely suspended trip device bearing upwardly against and adapted to release said trigger, and a supplementary spring connected to said striker and adapted to operate as a governor at the return movement of the same.

11. In an animal trap, a supporting frame, a striker movable upon said frame, means for actuating said striker, an arm connected to and projecting laterally from said frame at the upper end thereof and having a relatively large opening, a trip rod extending through the opening in said arm and having a plate at the upper end and a bait support at the lower end, and a trigger latch pivoted between its ends in said arm and provided at one end with a pawl to be engaged by the striker and at its opposite end with an enlarged head resting upon the plate at the upper end of the trip rod.

12. In an animal trap, a base, a striker movable upon said base, means for actuating the striker and returning the same to set position after each stroke, and means for causing travel of the base during return movement of the striker.

In testimony whereof I affix my signature in presence of two witnesses.

THOMAS J. BURKE. [L. S.]

Witnesses:
 FRANK J. BURKE,
 R. M. SEWARD.

Copies of this patent may be obtained for five cents each, by addressing the "Commissioner of Patents, Washington, D. C."